(12) United States Patent
Hirayama

(10) Patent No.: US 7,773,496 B2
(45) Date of Patent: Aug. 10, 2010

(54) COMBINATION TYPE OPTICAL DISK MEDIUM, ITS REPRODUCTION METHOD AND OPTICAL DISK APPARATUS

(75) Inventor: Hiroshi Hirayama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 518 days.

(21) Appl. No.: 11/843,007

(22) Filed: Aug. 22, 2007

(65) Prior Publication Data
US 2008/0244632 A1  Oct. 2, 2008

(30) Foreign Application Priority Data
Mar. 27, 2007  (JP) .............................. 2007-080479

(51) Int. Cl.
G11B 7/00  (2006.01)
(52) U.S. Cl. ..................................... 369/275.3; 369/94
(58) Field of Classification Search ................. 386/103; 369/94, 275.3, 283
See application file for complete search history.

(56) References Cited

U.S. PATENT DOCUMENTS 7,471,616 B2 * 12/2008 Kajigano ................. 369/275.3
2006/0275713 A1 * 12/2006 Nakatani ..................... 430/321
2007/0002699 A1 *  1/2007 Suh .......................... 369/30.07

FOREIGN PATENT DOCUMENTS

JP  2005-174345  6/2005
JP  2006-172574  6/2006

* cited by examiner

*Primary Examiner*—Wayne R Young
*Assistant Examiner*—Adam R Giesy
(74) *Attorney, Agent, or Firm*—Antonelli, Terry, Stout & Kraus, LLP.

(57) ABSTRACT

An optical disk apparatus for use with the combination type optical disk medium comprises an optical head capable of accessing the first and second recording layers and reading recording marks, a demodulator for applying a demodulation process to a signal read out of the first or second recording layer, an address converter for deciding from an optical disk reproduction instruction a recording layer to be accessed and performing conversion to a physical address of the recording layer, a reproduction controller following the recording layer determination and the physical address to control the optical head and the demodulator so as to control access and reproduction to and from the optical disk medium, and an instruction generator for generating an instruction to reproduce the optical disk.

11 Claims, 7 Drawing Sheets

HD DVD / DVD COMBINATION

BD / DVD (DUAL LAYER) COMBINATION

BD / HD DVD (DUAL LAYER) COMBINATION

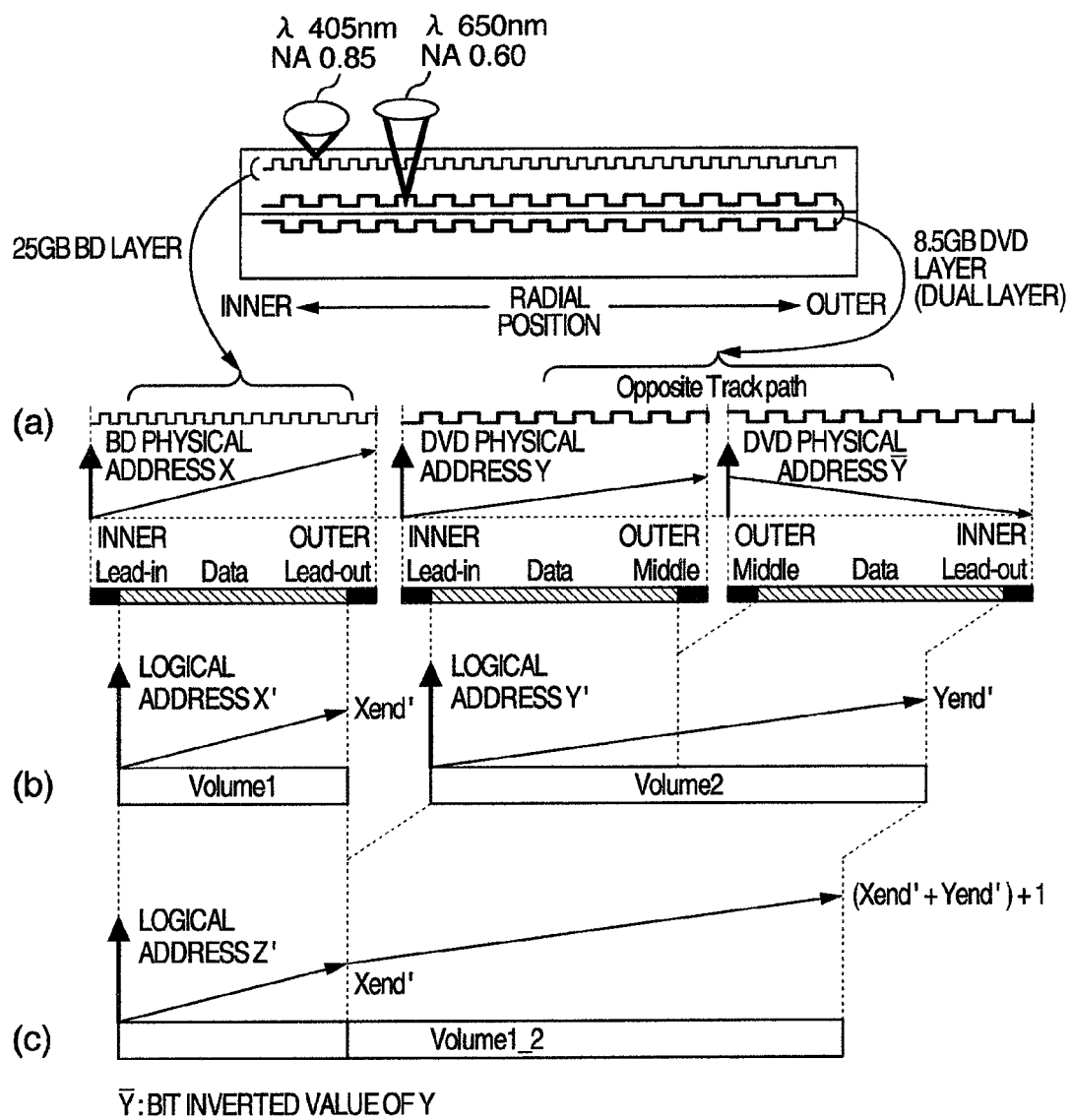

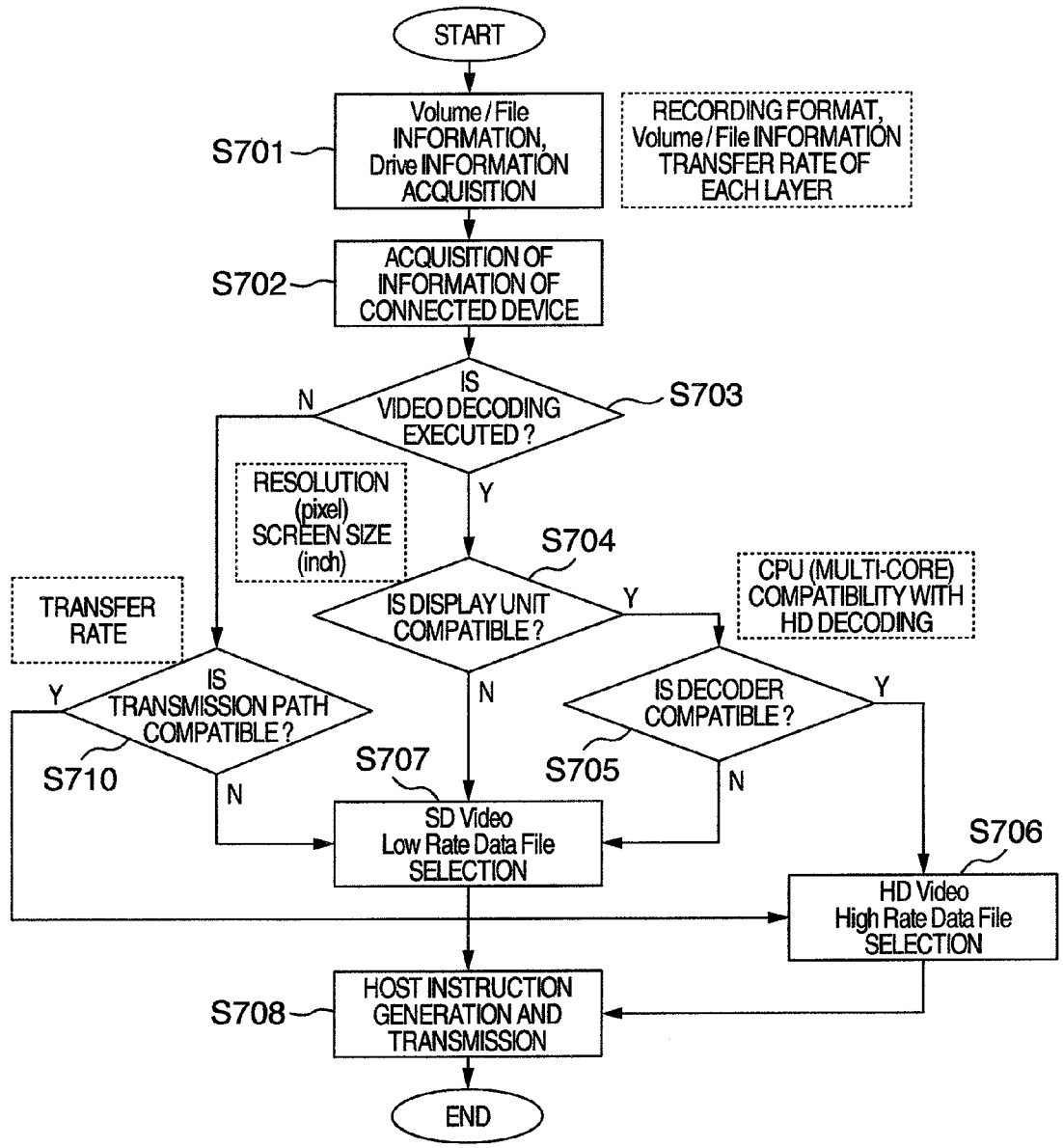

COMBINATION TYPE OPTICAL DISK MEDIUM, ITS REPRODUCTION METHOD AND OPTICAL DISK APPARATUS

INCORPORATION BY REFERENCE

The present application claims priority from Japanese application JP2007-080479 filed on Mar. 27, 2007, the content of which is hereby incorporated by reference into this application.

BACKGROUND OF THE INVENTION

The present invention relates to a combination type optical disk medium, its reproduction method and an optical disk apparatus.

Following a DVD (Digital Versatile Disk) aiming at conservation of video information, blue-ray (BD) and HDDVD optical disks both aiming at conservation of HDV (High Definition Video) and besides optical disk recording apparatus adaptable to these types of media have been developed. The DVD, BD and HDDVD have different disk formats representative of disk structure and modulation scheme, respectively, and therefore, apparatus dedicated to the individual types of formats and an interchangeable unit compatible with respective formats are needed. On the other hand, the optical disk is a removable medium and is therefore desired to be reproducible with various kinds of apparatus while being as less restricted by disk formats as possible. Under the circumstances, a combination type optical disk has been proposed in which recording layers of a plurality of disk formats are formed in a single disk. For further information of the combination type optical disk medium, JP-A-2006-172574, for example, may be referred to.

Incidentally, a computer, recorder or player unit to be connected to the optical disk apparatus includes a file system as a system for management of data recorded in an optical disk. The file system is a system adapted to identify and manage files and directories contained in an access area, that is, a volume space of the optical disk and as an example, a UDF (Universal Disk Format) adopted in the DVD, BD or HDDVD may be taken up. As for the file system, one may refer to JP-A-2005-174345, for example.

SUMMARY OF THE INVENTION

In recent years, development of DVD and either BD or HDDVD and optical disk apparatus capable of reproducing the individual DVD, BD and HDDVD as well has been advancing and conceivably, even in a combination type optical disk medium, it will become possible to access and reproduce each recording layer with a single apparatus.

In this situation, access and reproduction to and from plural recording layers contained in the combination type optical disk has been deemed to handle a single volume space of large capacity and a problem resides in realizing a method therefor. A further problem resides in how to control access and reproduction while making the correspondence between a logical address and a physical address modulated for each recording layer in the volume space of large capacity.

On the other hand, there is another problem that for an apparatus in which individual recording layers, handled as independent volume spaces, are accessed and reproduced and so the reproducible disk format is restricted, reproduction compatibility needs to be maintained.

In addition, when the combination type optical disk is utilized in such a way that, for example, contents of HD video quality is recorded in a high density recording layer of BD and contents of SD video quality is recorded in a DVD layer, reproduction can be carried out while choosing the video quality. Preferably, the video quality is chosen properly in accordance with specifications of a decoder for video signal processing and of a display unit. Accordingly, yet another problem resides in a method of selecting the quality of a reproduced video.

An object of the present invention is to provide a combination type optical disk medium which can solve the problems described as above, its reproduction method and its optical disk apparatus.

To solve the above problem, a combination type optical disk medium according to the present invention comprises first and second volume spaces formed for first and second recording layers, respectively, each of the volume spaces including identification information indicative of head or end of the volume space, information indicative of file and directory structures and an area of data, and a single consecutive volume formed by the first and second volume spaces, having identification information indicative of its head or end recorded.

Further, to solve the above problem, an optical disk apparatus according to the present invention comprises an optical head capable of accessing first and second recording layers and reading recording pits, demodulation means for demodulating a signal read out of the first or second recording layer, address conversion means responsive to an optical disk reproduction instruction to select a recording layer to be accessed and execute conversion to a physical address for the selected recording layer, reproduction control means for controlling the optical head and demodulation means in accordance with the selected recording layer and the physical address to control access and reproduction to and from the selected recording layer, and instruction generation means for generating the optical disk reproduction instruction, wherein the instruction generation means generates the reproduction instruction including logical addresses of access destinations in the single consecutive volume space comprised of the first and second recording layers and the address conversion means selects a recording layer on the basis of a logical address contained in the reproduction instruction and an address of the boundary between the first and second recording layers constituting the volume space and executes conversion to a physical address for the selected recording layer.

According to the present invention, data file contained in individual recording layers of the combination type optical disk medium can be accessed and reproduced in a seamless fashion and besides the individual recording layers can also be handled as independent volume spaces. Thus, a combination type optical disk medium which can maintain compatibility with the reproduction apparatus restricted in compatibility of format can be provided and its reproduction method and apparatus can also be provided.

Furthermore, by selecting optimum video quality and transfer rate in accordance with specifications of a decoder for processing optical disk reproduction data and a peripheral device such as a display and with the transmission band of data to a connected apparatus and by selecting a recording layer, a volume space and recording data on the basis of the results of selection, access and reproduction to and from the combination type optical disk can be controlled optimally.

Other objects, features and advantages of the invention will become apparent from the following description of the embodiments of the invention taken in conjunction with the accompanying drawings.

BRIEF DESCRIPTION OF THE DRAWINGS

FIG. 3 is a diagram illustrating examples of volume space in the combination type optical disk.

FIG. 7 is a flowchart for explaining a method for selection of a recording layer to be accessed.

DETAILED DESCRIPTION OF THE EMBODIMENTS

The present invention will now be described by way of example with reference to the accompanying drawings.

Embodiment 1

Figure 2A:
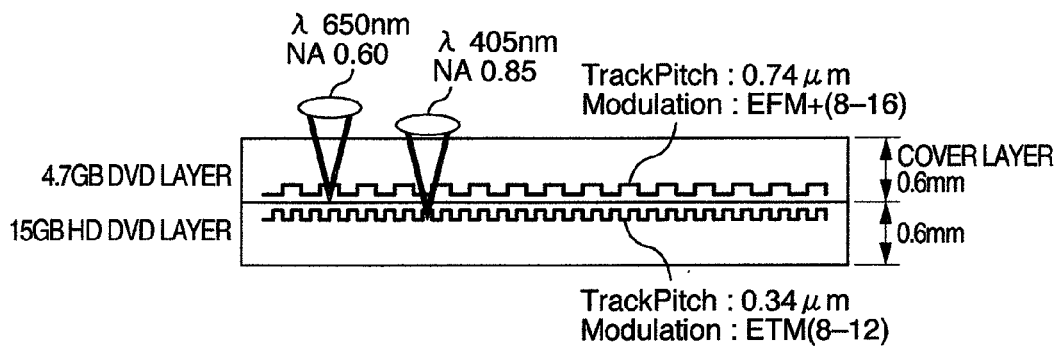
FIGS. 2A to 2C are diagrams useful in explaining examples of medium structure in a combination type optical disk.
Figure 2B:
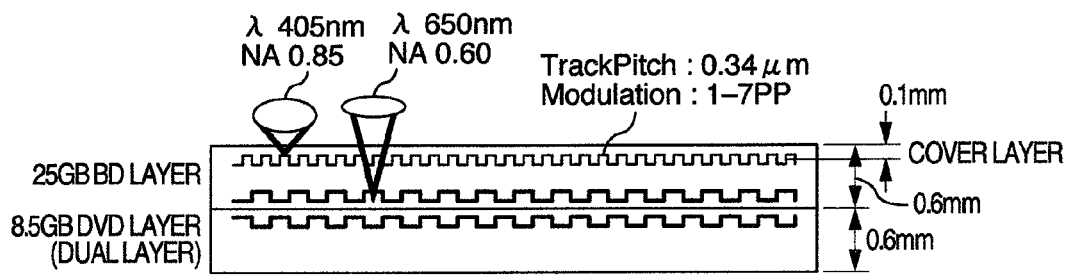
Figure 2C:
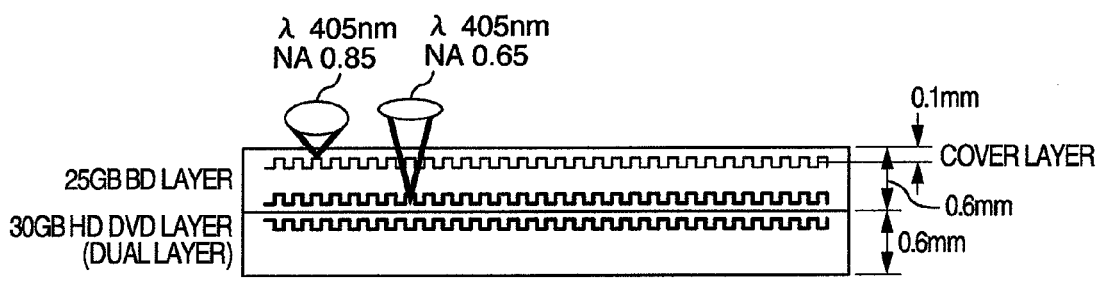

Referring first to FIGS. 2A to 2C, a combination type optical disk used in the present invention (hereinafter simply referred to as "optical disk") will be described. FIGS. 2A, 2B and 2C illustrate instances where recording layers of formats pursuant to respective standards of DVD and HDDVD, BD and DVD and BD and HDDVD are formed, respectively, in a single optical disk. For a DVD layer, a laser beam is irradiated on a recording pit (mark) by means of an optical head specified by a laser wavelength $\lambda=650$ nm (red) and an objective lens numerical aperture NA=0.60 as well and a reproduction signal is obtained from a reflected beam. The disk format of DVD layer has a track pitch of 0.74 µm and adopts an (EFM+ modulation) scheme to achieve a recording capacity of 4.7 GB for single layer structure and 8.5 GB for dual layer structure, functioning to mainly record a video of SD (Standard Definition) video quality. The BD layer, for which $\lambda=405$ nm (blue violet), an optical head having a NA=0.85, a track pitch of 0.34 µm and a 1-7 PP modulation scheme are employed, achieve a recording capacity of 25 GB. The HDDVD layer, for which $\lambda=405$ nm (blue violet), an optical head having a NA=0.65, a track pitch of 0.34 µm and an ETM(8-12) modulation scheme are employed, achieve a recording capacity of 15 GB for single layer and 30 GB for dual layer. Principally recorded on the BD and HDDVD layers are videos of high definition (HD) video quality. In any type of optical disk in FIGS. 2A to 2C, access to all recording layers can be accomplished by irradiating a laser beam from one side surface of the disk.

Figure 1:
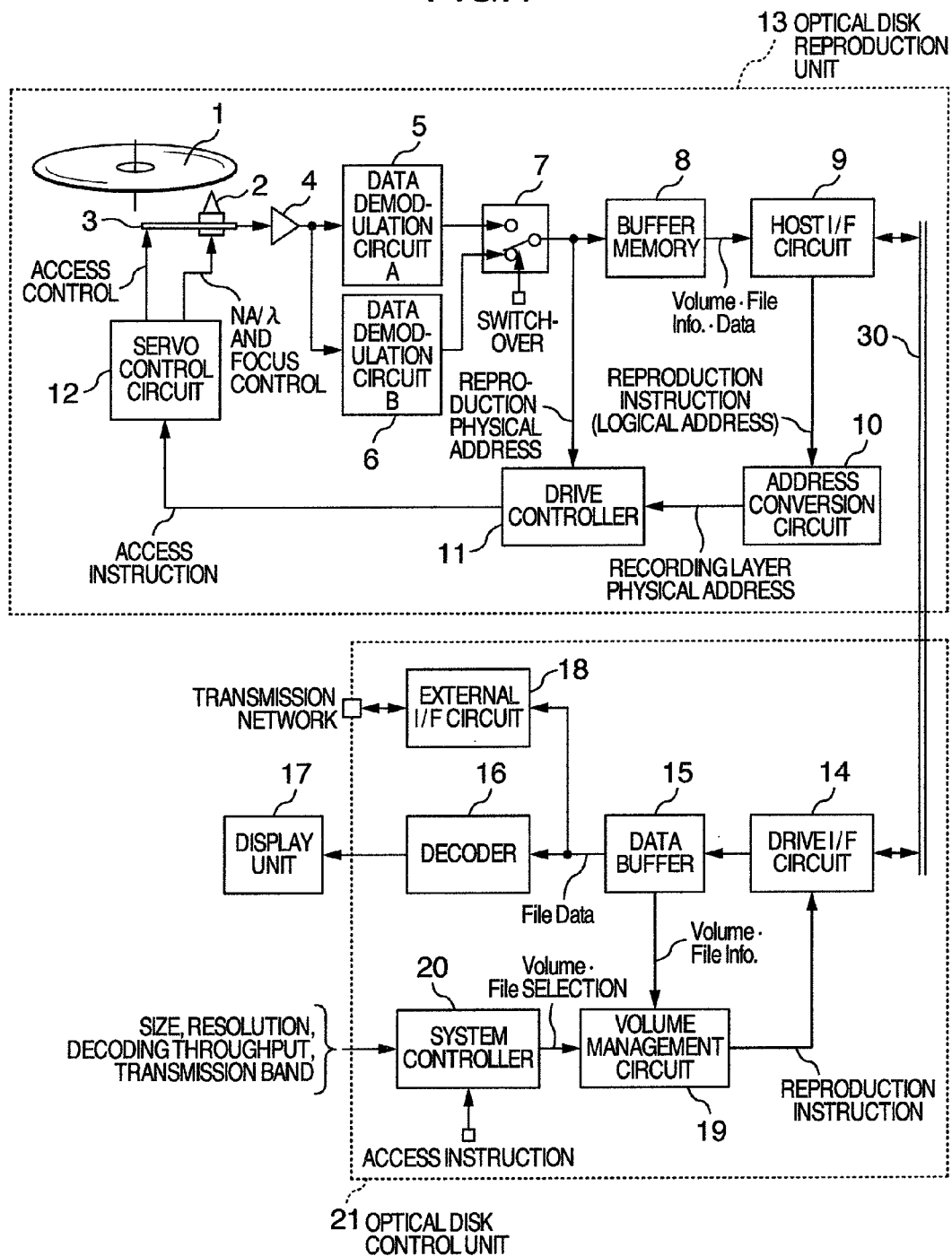
FIG. 1 is a block diagram of an optical disk apparatus according to an embodiment of the present invention.

Turning to FIG. 1, an optical disk apparatus useful in explaining the first embodiment of the invention is illustrated in block diagram form. A combination type optical disk medium 1 as set forth so far with reference to FIGS. 2A to 2C can be reproduced by means of an optical disk reproduction unit 13 comprised of components as described below. More particularly, an optical head 2 can access a recording layer and read a recording pit (mark) in the mode of combinations of two of DVD, BD and HDDVD or in the mode of all kinds of formats and it can be changed in laser wavelength $\lambda$ and objective lens numerical aperture NA. A head moving means 3 is adapted to move the optical head 2 of the optical disk 1 radially and a preamplifier 4 applies band limit and amplification to a recording pit (mark) read signal. Data demodulation circuits A and B as designated by reference numerals 5 and 6, respectively, perform demodulation processing in association with modulation schemes adapted for signals read out of individual recording layers, so that demodulation process operations complying with modulation schemes for, for example, either DVD and BD or DVD and HDDVD, BD and HDDVD as well, respectively, can be executed. In case all kinds of disk formats (for DVD, BD and HDDVD) are to be dealt with, three demodulation means are required to be provided but only two demodulation means are illustrated herein with a view to explaining reproduction operation for the two formats as illustrated in any one of FIGS. 2A, 2B and 2C. A selector 7 selects decoded data delivered out of the individual demodulation means, a buffer memory 8 temporarily stores selected demodulated data, a host I/F (interface) circuit 9 follows a predetermined data transfer protocol to control transfer of data to an optical disk control unit 21 to be described later through the medium of a data bus 30, an address conversion circuit 10 converts a heading logical address of a volume space (or access space) in optical disk 1 into a physical address of each recording layer, the heading logical address being contained in a reproduction instruction received from the optical disk control unit 21 via the host I/F circuit 9, a drive controller 11 controls access and reproduction to and from the optical disk 1, and a servo control circuit 12 controls access to a reproduction target position by controlling focus of the objective lens the optical head has and using the head moving means 3.

Next, the optical disk control unit 21 will be described. A drive I/F circuit 14 controls transfer of data to the optical disk reproduction unit 13, a data buffer 15 temporarily stores demodulated optical disk data received by way of the drive I/F circuit 14, a decoder 16 applies decoding processing to video data and audio data stored in the data buffer 15, and a display unit 17 displays a decoded video signal. An external I/F circuit 18 controls transfer of buffering data to an externally connected apparatus through the medium of a network, a volume management circuit 19 generates an access to a reproduction file and a reproduction instruction thereto while identifying an access (volume) space in the optical disk and file and directory structures contained in the volume, and a system controller 20 follows an access command designated by a user, for example, to generate a reproduction instruction through the volume management circuit and at the same time, executes selection of a recording layer suitable for reproduction of the optical disk 1 and control of access thereto and reproduction therefrom on the basis of the band of a transmission network, specifications of display unit 17 such as size and resolution and the decoding capability of decoder 16 as well.

Presumably, process operation in the drive controller 11 and address conversion circuit 10 included in the optical disk reproduction unit 13 and that in the system controller 20 and volume management circuit 19 included in the optical disk control unit 21 may be conducted in the same microcomputer but for convenience of explanation of functional block construction and operation, they are illustrated separately in FIG. 1.

Figure 4:
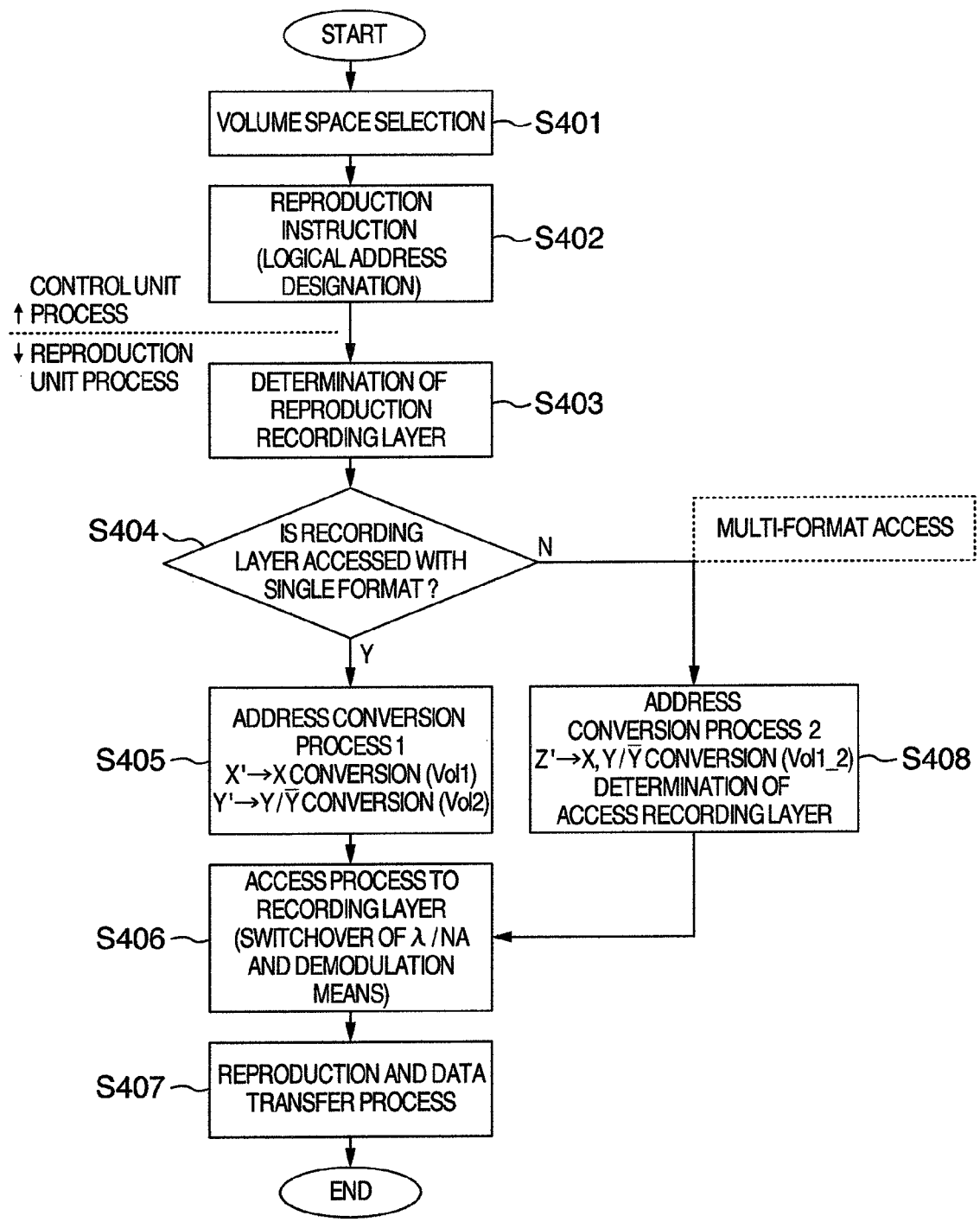
FIG. 4 is a flowchart for explaining a method for access and reproduction to and from the optical disk.

A method for access and reproduction to and from each recording layer of optical disk 1 carried out by the optical disk reproduction unit 13 will be described with reference to FIGS. 3 and 4.

FIG. 3 is a diagram useful to explain an example of the correspondence between volume space and logical address and between recording layer and physical address in the optical disk medium of FIG. 2B (combination type optical disk medium comprised of BD and DVD layers). Illustrated at (a) in FIG. 3 are structures of physical areas corresponding to recording layers of BD and DVD layers, respectively, and the correspondence between physical area and physical address. Illustrated at (b) in FIG. 3 are individual recording layers handled as or in the form of volume spaces and the correspondence of the volume space with logical address. Illustrated at (c) in FIG. 3 are individual recording layers in the form of a single consecutive volume space and the correspondence of the volume space with logical address.

As shown at (a) in FIG. 3, the BD layer includes a lead-in area, a data area and a lead-out area. The DVD layer having two recording layers includes a lead-in area, a data area, a middle area and a lead-out area. Physical address X of BD layer increases from inner to outer radial direction. Physical address Y of DVD layer increases from inner to outer radial direction in the first layer but decreases from outer to inner radial direction in the second layer. The DVD layer uses an opposite track pass in this manner, so that the two recording layers are arranged in such a manner that recording data continue in sequence of inner to outer radial direction of the first layer and then outer to inner radial direction of the second layer.

Of the said physical areas, the data area corresponds to the volume space. The optical disk control unit 21 generates a reproduction instruction for a volume space so as to control access to the optical disk 1. In an instance at (b) in FIG. 3, the data area of BD layer corresponds to volume 1 and the data areas of DVD layers correspond to volume 2. In each volume space, the volume head is set to a logical address 0 and addresses are allotted every logical block which is an access unit in the volume space. Specifically, addresses ranging from head address 0 to end address Xend' are allotted to the volume 1 and addresses ranging from head address 0 to end address Yend' are allotted to the volume 2.

An illustration useful to explain an instance where the two volume spaces are handled consecutively as a single continued volume space is given at (c) in FIG. 3, indicating that the data area of BD layer is arrayed in the former half of the single volume 1-2 and the data area of DVD layer is arrayed in the latter half. In logical address Z' of the single volume 1-2, the head address is 0 and the end address is (Xend'+Yend')+1.

The allocation of logical address is effected herein on the presupposition that the data quantity of one logical block equals that of one logical block constituting the volume shown at (b) in FIG. 3. Contrarily, it is possible that the data quantity of one logical block differs for each of the two volume spaces shown at (b) in FIG. 3 but in forming the single volume space shown at (c) in FIG. 3, the unit of data quantity is the same throughout the logical blocks and logical addresses are allotted to the volume space.

In accessing a volume space in which the data quantity differs logical block by logical block or accessing an instance where the data quantity is changed with the volume structure, the address conversion circuit 10 acquires, from the optical disk control unit 21, information regarding the data quantity of one logical block unit and then compares the information with a data quantity of a physical block (sector) of each recording layer to thereby convert a logical address into a physical address.

The volume space structure and the correspondence between logical address and physical address have been described in the above by way of example of the combination type optical disk of FIG. 2B but for the combination type optical disk media of FIGS. 2A and 2C, the volume space structure and logical address allocation can be set up in a manner similar to the above.

Access and reproduction to and from the volume space shown at (b) or (c) in FIG. 3 can be controlled with the optical disk apparatus shown in FIG. 1 as will be described hereunder with reference to FIG. 4.

Firstly, an access/reproduction control start process will be described. When an optical disk is mounted and is determined as a combination type optical disk medium of FIG. 3 through focus control and change control of λ and NA in the optical head 2, identification information is transferred to the optical disk control unit 21 via the host I/F circuit 9. The identification information corresponds to AVDP (Anchor Volume Descriptor Pointer) shown in FIGS. 5 and 6 to be explained later in connection with embodiment 2 and it indicates the start or end of a volume space. Through a method as will be detailed later in embodiment 2, the volume management circuit 19 recognizes that only volume spaces as shown at (b) in FIG. 3 exist or two types of volume spaces as shown at (b) and (c) exist. Thereafter, a volume space to be used during access and reproduction is selected by means of the system controller 20 (S401). After completion of selection of the volume space, access and reproduction to and from a file constituting the volume space are designated in accordance with an access instruction and besides, the volume management circuit 19 determines a logical address of the selected file through a file/directory identifying sequence carried out by the file system, thereby generating a reproduction instruction (S402). The instruction to select and reproduce the volume is sent to the optical disk reproduction unit 13 through the drive I/F circuit 14 and host I/F circuit 9.

On the basis of the information for volume space selection, the address conversion circuit 10 selects a recording layer to be accessed and reproduced from recording layers existent in the optical disk 1 (S403). It will be appreciated that the selection information is delivered out of the volume management circuit 19 as a result of the selection in the step S401 and is indicative of the result of selection of the volume space to be used during access and reproduction.

In case the selection result in the step S403 shows that a recording layer of single format is selected (S404), access and reproduction to and from the volume 1 or 2 at (b) in FIG. 3 is to proceed and the address conversion circuit 10 converts an access logical address constituting the reproduction instruction into a physical address for the selected recording layer (S405). For example, in the case of access to the recording layer constituting the volume 1, the access logical address X' is converted into the BD physical address X. In the case of accessing the recording layers constituting the volume 2, the access logical address Y' is converted into the DVD physical address Y in connection with the DVD first layer and into bit conversion values of Y in connection with the DVD second layer.

The drive controller 11 performs a process of accessing the recording layer and corresponding physical access selected by the address conversion circuit 10 by generating and issuing an access instruction to the servo control circuit 12. The servo control circuit causes the optical head 2 to select a laser wavelength λ and an objective lens numerical aperture NA suitable for making focus on the selected recording layer, thus accessing it. Further, the data demodulation circuit suited to a disk format of the selected recording layer is selected by means of the selector 7 (S406) so that data demodulation of an optical disk reproduction signal may be done and besides, information indicative of physical address on the disk presently reproduced and contained in the demodulated data may be delivered to the drive controller 11. The drive controller 11 compares the detected physical address with a physical address of the access target and on the basis of a comparison result, controls the head moving means 3 and the focus of optical head 2 through the servo control circuit 12 so as to perform access and reproduction to and from the target position and to transfer demodulated reproduction data (S407).

The method of accessing and reproducing the individual volume spaces comprised of recording layers of single disk format as described above can also be applied to the case, where the volume space to be accessed changes each time a reproduction instruction is generated from the optical disk control unit 21, by proceeding with the steps starting with the step S401.

On the other hand, when the volume management circuit 19 identifies existence of a volume space as shown at (c) in FIG. 3 and the volume structure is selected in the step S401, the program proceeds as will be described below.

In the case of the volume space as shown at (c) in FIG. 3, the optical disk control unit 21 generates an instruction to execute access and reproduction to and from a single volume 1-2 including BD and DVD recording layers (S401, S402). In accessing the single volume space, the volume management circuit 19 does not identify the boundary between the BD and DVD layers and the volume boundary associated with the plural volume structures at (b) in FIG. 3, either and therefore, information as to whether a recording layer to be accessed is selected in the step S401 does not exist. Accordingly, in the step S403 and step S408, the address conversion circuit 10 consults an access logical address included in a reproduction instruction so as to decide a recording layer of access destination and perform conversion into a physical address corresponding to the determined recording layer.

For example, in deciding the recording layer, the BD layer is determined when (access logical address Z')≦(final logical address Xend' of BD layer) stands and conversion to physical address X corresponding to the BD layer is carried out. Contrarily, the DVD layer is determined when (access logical address Z')>(final address Xend' of BD layer) stands and conversion to physical address Y corresponding to the DVD layer is carried out. In the conversion to the physical address corresponding to the DVD layer, for example, conversion from (access logical address Z')−(BD layer final address Xend'+1) to the logical address value for the volume corresponding to only the DVD layer is first executed in accordance with, and then conversion to the physical address of DVD layer is executed. If the access logical address contained in the reproduction instruction is once converted into a logical address corresponding to a volume space including BD or DVD alone and the thus converted logical address is converted to a physical address, the conversion method can be used in common. After the process of selection of recording layer and conversion to physical address by the address conversion circuit 10, processes in the steps 406 and S407 are dealt with.

The final address Xend' of BD layer in the volume structure at (c) in FIG. 3 can be determined by subtracting a physical address value of the head of the data area of BD layer from a physical address of the end of the data area of BD layer and converting the difference to a logical address value in the volume space of BD layer. In case the head of volume space is the DVD layer, the final address Xend' can also be determined through a similar method.

Further, in accessing and reproducing the volume space at (c) in FIG. 3, an instance is conceivable in which reproduction is executed consecutively over different recording layers. For example, an instance will be described in which access and reproduction start from the BD layer and reproduction proceeds sequentially over the DVD layer. In this case, in the initial access and reproduction, the process flow of FIG. 4 is followed and the executed selection of the BD layer, access and reproduction. When responding to detection of the final physical address of the data area constituting the BD layer, the drive controller 11 controls the servo control circuit to stop the reproduction and then the optical head 2 and selector 7 are switched over, followed by controlling access and reproduction to and from the data area head of DVD layer.

In the first embodiment described as above, recording layers of different disk formats contained in the combination type optical disk medium are handled as either separate volumes or a single consecutive volume space and, for the purpose of accessing, the optical disk control unit 21 selects an access volume space and generates a reproduction instruction so that the optical disk reproduction unit 13 may select a recording layer to be accessed and perform conversion to a physical address, together with selection of the laser wavelength and lens numerical aperture of optical head and of demodulation means as well suitable for the selected recording layer, thereby ensuring that access and reproduction to and from each recording layer can be executed in the combination type optical disk.

In executing access and reproduction to and from the single volume space structure at (c) in FIG. 3, the volume management circuit 19 has been described as generating the reproduction instruction without discriminating the presence of the BD layer from that of the DVD layer but conceivably, when the optical disk reproduction circuit deals with transfer of information concerning a logical address of the recording layer boundary, the volume management circuit 19 may transmit information concerning recording layer or disk format of an access destination, along with inclusion of the transfer information in a reproduction instruction. In this case, the address conversion circuit 10 conceivably follows the thus transmitted information to execute selection of an access recording layer and conversion to a physical address and the process flow of FIG. 4 can be applied as it is.

Embodiment 2

In structuring the volume space at (b) or (c) in FIG. 3 in the combination type optical disk medium, the structure of the volume space, identification of the volume, the file and directory structures and the access to the file will be described below.

Figure 5:
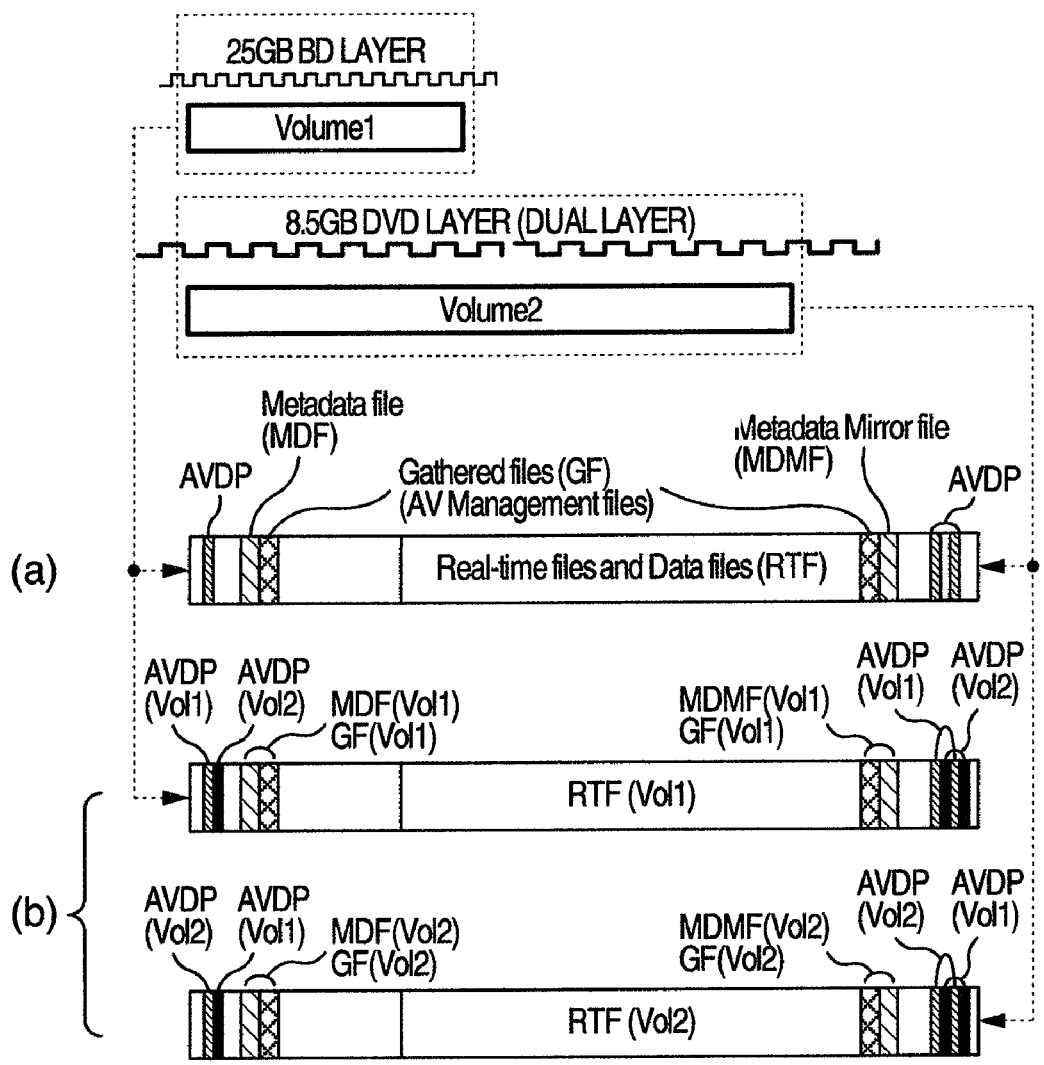
FIG. 5 is a diagram showing an example of internal structure of the volume in the combination type optical disk.

Referring to FIG. 5, a description will be given of an example of area structure of a conventional volume space, especially based on the UDF (Universal Disc Format), at (a) in FIG. 5. An AVDP (Anchor Volume Descriptor Pointer) is an area containing a volume identifier that indicates the start of a volume space and the volume management circuit 19 identifies the presence of the volume space on the basis of the AVDP (identifier information). An MDF designates an area for storage of information concerning file and directory structures contained in the volume space and is called meta data file. Further the volume space includes a storage area (RTF) of data for a file identified by the MDF and data requiring real time property during reproduction such as video and a data file for a computer are stored in the RTF.

The volume management circuit 19 detects the MDF in the course of volume identification process following AVDP detection. File and directory structures in the volume space are acquired on the basis of the MDF. Further, an instruction to reproduce data stored in an RTF area and corresponding to a file to be accessed is generated. Areas of the AVDP and MDF are also provided at the end of the volume space in order to protect the portion of interest from failing to be reproduced because of the defect on the disk.

Structures of two volume spaces shown at (b) in FIG. 3 are exemplified at (b) in FIG. 5. As shown at (b) in FIG. 5, volume spaces are provided for individual recording layers and each of information explained at (a) in FIG. 5 are recorded. Through this, compatibility with an optical disk having only one of the recording layers can be assured. Further, in one volume space, the ADVP for the other volume space is recorded. For example, in volume 1 of the BD layer, AVDP (Vol 2) for the DVD layer is recorded and in volume 2 of the DVD layer, AVDP (Vol 1) for the BD layer is recorded. This permits the volume management circuit 19 to identity the presence of the volume 2 for DVD layer without accessing the DVD layer even in the course of access to the volume 1 for BD layer.

Equally the MDF and its mirror MDMF and, like the AVDP, the volume space for one of the recording layers is recorded with the MDF and MDMF of the volume space for the other recording layer. In other words, MDF (Vol 2) and MDMF (Vol 2) for DVD layer are recorded in the volume 1 for BD layer and MDF (Vol 1) and MDMF (Vol 1) for BD layer are recorded in the volume 2 for DVD layer. With this structure, not only the volume identification can be assured but also the file directory structures can be detected by merely accessing one of the recording layers. If assurance of the volume area is restricted, provision of the MDMF (Vol 1) and MDMF (Vol 2) in different counterpart volume spaces can be omitted.

With the volume space structured as described above, the existence of a plurality of volume spaces and the file and directory structures can be identified by reproducing only a recording layer initially accessed during mount of an optical disk and the volume management circuit 19 can complete the process for volume space identification in a short period of time. In accessing and reproducing the volume space structure described above, the reproduction method explained in connection with FIG. 4 can be applied and the system controller 20 may select the volume space to be accessed in accordance with the file and directory structures detected by the volume identification circuit 19 and the designated access instruction as well and the volume management circuit 19 may generate a reproduction instruction from the volume selection result and the logical address for the access file to thereby control the optical disk reproduction circuit.

As regards storage of the AVDP, MDF and MDMF, the AVDP (Vol 2), MDF (Vol 2) and MDMF (Vol 2) for the DVD layer may be assured or provided in, for example, the BD layer alone and they may not be provided in the DVD layer. This is on the presumption that the optical disk apparatus initially detects the BD layer and information shared by the mutual volume areas intends to be minimized as suppressedly as necessary. On the contrary, information for BD layer may be shared by the DVD layer alone.

Figure 6:
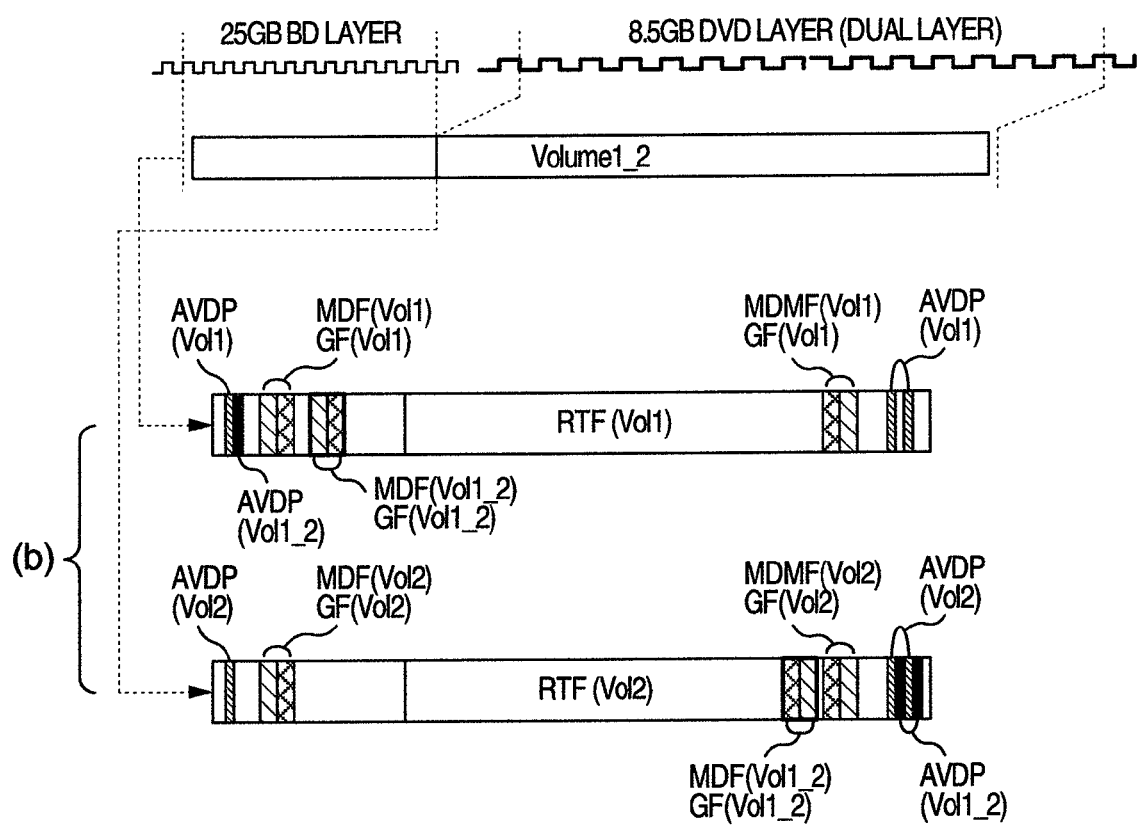
FIG. 6 is a diagram showing another example of internal structure of the volume in the combination type optical disk.

When individual recording layers of the combination type optical disk medium are handled as a single volume space, areas in the volume are structured as exemplified in FIG. 6.

In FIG. 6, too, volume spaces are provided in respect of the individual recording layers and individual pieces of information explained at (a) in FIG. 5 are recorded. This ensures that the compatibility of an optical disk having only one type of the recording layers can be maintained. Further, in order that the recording layers can be accessed as a single consecutive volume 1-2, the AVDP (Vol 1-2) and metadata file MDF (Vol 1-2) for the volume 1-2 are allotted to the head of volume 1-2 included in the BD layer. Further, the identical AVDP (Vol 1-2) and a mirror MDMF are allotted to the end area of volume space included in the DVD layer. Accordingly, together with recording of the AVDP, MDF and MDMF for volume spaces of the individual BD and DVD layers, the AVDP (Vol 1-2), MDF (Vol 1-2) and MDMF (Vol 1-2) for the single consecutive volume 1-2 are also recorded. A volume identifier for the volume 1-2 space is detected at AVDP (Vol 1-2), the MDF (Vol 1-2) is detected and the MDF (Vol 1-2) collectively stores information concerning file and directory structures for RTF (Vol 1) and RTF (Vol 2) representing real time data for the BD and DVD layers, respectively. Assignment of the AVDP, MDF and MDMF for the volume 1-2 is not restricted to the head of BD layer and the end of DVD layer and conceivably, they may be provided at the head and end areas, respectively, of each recording layer with a view to promoting the reliability of detection of the volume identification and file and directory structures.

By structuring the single consecutive volume space as above, management of recording layers of different formats and a plurality of volume spaces can be unneeded and access and reproduction to and from the single volume space can be controlled. On the other hand, volume detection of each independent recording volume space can be assured and access and reproduction of file and directory can also be assured. For example, even in an apparatus capable of reproduction of only one of the recording layers, reproduction compatibility can be maintained.

The reproduction method explained in connection with FIG. 4 can be applied to the access and reproduction to and from the volume space structured as above.

Embodiment 3

The optical disk control unit 21 controls access and reproduction of the recording layer included in the combination type optical disk medium and the recording data as will be described below with reference to FIG. 7. As the medium subject to the control, the combination type optical disk medium structuring, for example, the volume space of FIG. 5 or 6 comes up and it will be assumed that for example, video data of HD video quality is stored in the volume space of BD layer, video data of SD video quality is stored in the volume space of DVD layer and the transfer rates of reproduction data in respect of the individual recording layers are related to each other by (transfer rate for BD layer)>(transfer rate for DVD layer).

In FIG. 7, when an optical disk 1 mounted to the optical disk reproduction unit 13 is ready for reproduction, the optical disk control unit 21 controls reproduction of AVDP from each layer of the optical disk 1 and then, on the basis of the detection result, detects a volume space for the optical disk 1. For example, on the presupposition that the optical disk constitutes the volume space shown at (c) in FIG. 6, the volume management circuit 19 generates not only an instruction to reproduce volume spaces AVDP (Vol 1) and AVDP (Vol 2) for the individual separate recording layers but also an instruction to reproduce AVDP (Vol 1-2) for the single volume space 1-2 and controls the optical disk reproduction unit 13 to cause it to execute reproduction operation.

Since logical addresses have been reserved for the AVDP, the volume management circuit 19 responds to the logical addresses to generate instructions to reproduce the AVDP (Vol 1), AVDP (Vol 2) and AVDP (Vol 1-2). The volume management circuit 19 detects volume identifiers from reproduction data acquired in response to the individual reproduction instructions to detect volume spaces depending on the detection results. Further, from the results of volume detection, the system controller 20 selects a volume space used for access and the volume management circuit 19 generates an instruction to reproduce MDF or MDMF corresponding to the selected volume space, thus obtaining file and directory information for the selected volume space. On the other hand, drive information representing the transfer rates for the individual recording layers is acquired (S701). In the present embodiment, through the process for identification and selection of volume space set forth so far, either the plural volume structures of FIG. 5 or the structure of volume 1-2 shown in FIG. 6 is selected and for example, (transfer rate for BD layer)>(transfer rate for DVD layer) stands in connection with transfer rates for the individual recording layers.

While performing the selection of volume space and detection of file and directory structures, the system controller 20 acquires, from means for processing optical disk reproduction data as represented by the decoder 16, display unit 17 and external I/F circuit 18, their specifications and information concerning the operation condition at present. Specifically, the acquired information includes information obtained from decoder 16 which indicates whether decoding corresponds to HD video data decoding, decoding is based on dedicated hardware or decoding is carried out through operation process using a central processing unit (CPU) such as a computer and information, available in the case of decoding based on the CPU, which indicates whether the CPU has the throughput of decoding video data of HD or SD video quality, that is, has the fast throughput or the multi-CPU structure capable of performing the distributed processing of video decoding tasks.

Data displayed on the display unit 17 includes information concerning the screen size and resolution and information which concerns the external I/F circuit about the transmission speed of transmission network per se and the data throughput in the externally connected apparatus, that is, video quality handled by the external apparatus, and transfer rate of a recording apparatus such as HDD or optical disk (S702). On the other hand, the system controller 20 follows the access instruction to select a file contained in the optical disk and execute access and reproduction to and from the file data through the volume management circuit 19 but in case the reproduction of video file is selected in step S703, the program proceeds to step S704 where it is decided whether specifications of display unit 17 such as the screen size and resolution are suitable for HD video file reproduction.

If in the step S704 the display unit 17 is determined as being suitable for HD video file reproduction, the program proceeds to step S705 where suitability of the decoder 16 is decided. When such conditions that the decoder 16 is compatible with, for example, HD videos and that the decoder 16 has the throughput enough to deal with the HD video decoding process in the course of decoding carried out through the CPU operation process are determined to be satisfied, reproduction of the HD video file is selected (S706). In addition, in accordance with the result of selection, the volume management circuit 19 generates an instruction to reproduce the HD video file in the volume space of BD layer (S708) and then the optical disk reproduction unit 13 executes access and reproduction.

On the other hand, when the display unit 17 and decoder 16 are determined as being unsuitable for reproduction of the HD video file, reproduction of SD video file is selected (S707). Following the selection result, the volume management circuit 19 generates an instruction to reproduce the SD video file in the volume space for DVD layer (S708) and the optical disk reproduction unit 13 executes access and reproduction.

As described above, by means of the optical disk reproduction unit 13 which can access and reproduce the individual recording layers contained in the combination type optical disk and of the optical disk control unit 21, control of selection and reproduction of a video file having picture quality optimized for connected display unit or decoder can be assured.

For example, there is an instance where decoding of a video file is executed not by specific hardware but by a CPU mounted in a computer and in this case, a problem arises in which the video decoding is processed most preferentially for the purpose of keeping its real time property, causing another CPU process to be waited for or the real time property is impaired upon reception of a CPU interruption process. This problem can be solved by using the method described in the foregoing.

According to a specified method, the system controller 20 may effect switchover between HD and SD video file reproduction operations in accordance with the throughput and occupation condition of the CPU utilizable for decoding or a generation condition of process by another CPU; or the upper limit of CPU occupation rate assignable to the video decoding process may be determined and the remainder may be allotted to a different CPU process.

Finally, reproduction control in case reproduction data is transferred to a connected apparatus via the external I/F circuit will be described.

For example, it is conceivable that the video file data is transferred via the external I/F circuit and the externally connected apparatus executes decoding. In this case, in step S710, the transfer rate of transmission network is compared with a transmission rate necessary for performing video recoding on real time base and selection of HD or SD video file (S706, S707) is controlled.

Further, it is conceivable that a video file to be reproduced is selected in step S710 in accordance with a congested condition of the transmission network. For example, in the event that the throughput of data transmission decreases owing to congestion of the transmission network, the program branches to the step S707 to select an SD video file and then reproduce the selected file. By selecting an SD video file having a low bit rate, that is, a small quantity of data decoded per unit time, real time properties of data transmission in the transmission network and decoding process in the externally connected apparatus can be assured.

Also conceivable is an instance where reproduced data not subjected to video decoding may be transferred through the transmission network to a recording device (semiconductor memory, HDD: Hard Disc Drive or optical disk) mounted to the externally connected apparatus. In this case, comparison is made in the step S710 between the rate of data transfer to the recording device connected through the transmission network and the transfer rate for each recording layer obtained in the step S701.

When a condition of (throughput in data transfer)>(transfer rate for BD layer) is met, the program proceeds to the step S706 for making full use of the transfer rate of optical disk apparatus so as to access and reproduce a file contained in the BD layer. Considering the throughput in data transfer, the data transfer is a total transfer rate when data is transferred to the recording device through the transmission network, differing from the transfer rate for sole transmission network or recording device. By preferentially selecting a BD layer having a higher recording density than that of a DVD layer, not only the transfer rate can fully fulfill itself but also the transfer rate can be maintained while suppressing the optical disk revolution number to thereby contribute to suppression of power consumption in the optical disk apparatus.

As described above, according to the third embodiment, access and reproduction to and from a video file which is suitable for reproduction from the standpoint of the decoder for video data, specifications of display unit and operation conditions can be controlled.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A combination type optical disk medium comprising:
   first and second recording layers based on different recoding densities and modulation schemes, wherein first and second volume spaces are formed to said first and second recording layers, respectively;

each volume space includes identification information of the head or end of the volume space, information indicative of file and directory structures and an area for data; and one of the volume spaces is recorded with identification information of the other volume space.

2. A combination type optical disk medium according to claim 1, wherein the one volume space is additionally recorded with information indicative of file and directory structures contained in the other volume space.

3. A combination type optical disk medium comprising:

first and second recording layers based on different recoding densities and modulation schemes, wherein first and second volume spaces are formed to said first and second recording layers, respectively;

each volume space includes identification information of the head or end of the volume space, information indicative of file and directory structures and an area for data; and said first and second volume spaces are arrayed to form a single consecutive volume space; and identification information indicative of the head or end of said single consecutive volume is recorded.

4. A combination type optical disk medium according to claim 3, wherein in addition to the identification information for said single volume space, merged information including file and directory structure information for said first and second volume spaces included in said single volume space is recorded.

5. An optical disk apparatus for reproducing a combination type optical disk medium having first and second recording layers based on different recording densities and modulation schemes, comprising:

an optical head capable of accessing said first and second recording layers and reading recording pits;

a demodulation circuit for a signal reproduced from said first or second recording layer;

a reproduction control circuit for controlling said optical head and demodulation circuit so as to control access and reproduction to and from a selected recording layer; and an instruction generation circuit for an instruction to reproduce said optical disk, wherein said reproduction control circuit controls said optical head to cause it to access individual recording layers so as to detect the combination type optical disk medium; and said instruction generation circuit follows a result of said detection to generate a reproduction instruction with the aim of detecting identification information of the head or end of a volume space, consequently detects either first and second volume spaces or a single consecutive volume space and consequently selects a volume space and generates an instruction to reproduce the selected space.

6. A method of reproducing a combination type optical disk medium having first and second recording layers based on different recording densities and modulation schemes, comprising the steps of:

accessing an optical disk at the individual recording layers to detect the combination type optical disk medium; and following the detection result to detect identification information indicative of the head or end of the volume space so as to detect first and second volume spaces or a single consecutive volume space and consequently select a volume space so as to generate a reproduction instruction for the selected space.

7. An optical disk apparatus for reproducing a combination type optical disk medium having first and second recording layers based on different recording densities and modulation schemes and recorded with video data of high definition and video data of standard quality separately, comprising:

an optical head capable of accessing said first and second recording layers and reading recording pits;

a demodulation circuit for demodulating a signal read out of said first or second recording layer;

a reproduction control circuit for controlling said optical head and said demodulation circuit so as to control access and reproduction to and from a selected recording layer;

an instruction generation circuit for generating an instruction to reproduce said optical disk; and a decoding circuit for decoding reproduced video data, wherein said instruction generation circuit follows the decoding throughput of said decoding circuit to select a recording layer to be accessed and reproduced.

8. An optical disk apparatus according to claim 7 further comprising a display circuit for displaying a video signal representative of decoded video data, wherein in accordance with specifications such as screen size and resolution of said display circuit, said instruction generation circuit selects a recording layer to be accessed and reproduced.

9. An optical disk apparatus for reproducing a combination type optical disk medium having first and second recording layers based on different recording densities and modulation schemes and recorded with video data of high definition and video data of standard quality separately, comprising:

an optical head capable of accessing said first and second recording layers and reading recording pits;

a demodulation circuit for demodulating a signal read out of said first or second recording layer;

a reproduction control circuit for controlling said optical head and said demodulation circuit so as to control access and reproduction to and from a selected recording layer;

an instruction generation circuit for generating an instruction to reproduce said optical disk; and a transfer circuit for transferring reproduced data to an externally connected apparatus, wherein said instruction generation circuit follows a transfer rate of data transmitted through said transfer circuit to select a recording layer to be accessed and reproduced.

10. A combination type optical disk medium comprising a first recording layer based on a first standard and a second recording layer based on a second standard, wherein said first recording layer is recorded with information for management of said second recording layer, and said second recording layer is recorded with information for management of said first recording layer.

11. A combination type optical disk medium comprising a first recording layer based on a first standard and a second recording layer based on a second standard, wherein said first recording layer is recorded with management information for managing, as a single volume, a data area of said first recording layer and a data area of said second recording layer.

* * * * *